United States Patent Office 3,478,100
Patented Nov. 11, 1969

3,478,100
α,α-DIFLUORO-ALKYLAMINES AND PROCESS
David M. Gale, Wilmington, Del., assignor to E. I. du Pont de Nemours and Company, Wilmington, Del., a corporation of Delaware
No Drawing. Filed Oct. 22, 1965, Ser. No. 502,612
Int. Cl. C07c *87/22;* C23g *5/02*
U.S. Cl. 260—570.5                                      10 Claims

ABSTRACT OF THE DISCLOSURE

Fluoroalkylideneimines can be added to terminally unsaturated olefins having at least three carbon atoms in the presence of Friedel-Crafts catalysts to yield α,α-di(fluoroalkyl)amines. The α,α-di-(fluoroalkyl)amines are useful as metal degreasing agents.

DESCRIPTION OF THE INVENTION

This invention relates to new compositions of matter and to their preparation. More particularly, it relates to α,α-di(fluoroalkyl)amines.

The new compositions of this invention are represented by the formula

I     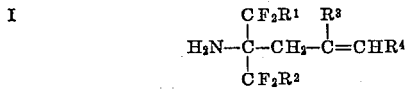

wherein (1) $R^1$ and $R^2$ each are fluorine, chlorine, perfluoroalkyl, ω-chloroperfluoroalkyl or ω-hydroperfluoroalkyl in which each said alkyl group contains 1 through 6 carbon atoms;

(2) $R^3$ is hydrogen, hydrocarbyl free of aliphatic unsaturation of 1 through 15 carbon atoms, or the group

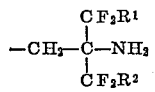

(3) $R^4$ is hydrogen, hydrocarbyl free of aliphatic unsaturation of 1 through 15 carbon atoms, the group

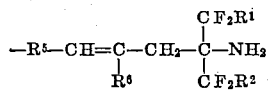

or the group

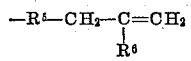

(4) $R^5$ is a divalent alkylene group of 1 through 6 carbon atoms;

(5) $R^6$ is hydrogen or hydrocarbyl free of aliphatic unsaturation of 1 through 15 carbon atoms; and wherein (6) The number of —NH$_2$ groups in the composition is not more than 2;

(7) The number of carbon atoms, exclusive of

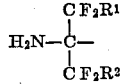

groups, is 3 through 18; and (8) The total number of carbon atoms in the composition is not more than 30.

The term "hydrocarbyl free of aliphatic unsaturation" defines a hydrocarbon group in which the only unsaturation that may be present is aromatic, i.e., there can be no aliphatic double or triple bonds. Thus, the hydrocarbyl groups include alkyl, cycloalkyl, aryl, alkaryl and aralkyl. Specific examples of such hydrocarbyl groups defined in the preceding paragraph under numbers (2), (3), and (5), include methyl, ethyl, pentyl, isooctyl, pentadecyl, cyclopropyl, cyclohexyl, phenyl, napthyl, benzyl, tolyl, and the like.

The process of this invention by which the novel compositions are produced comprises reacting, in the presence of a Friedel-Crafts catalyst at a temperature between 20–200° C. and under substantially anhydrous conditions, a fluoroalkylideneimine of the formula

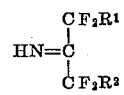

where $R^1$ and $R^2$ are as defined previously, with a terminally unsaturated mono- or diolefin of the formula

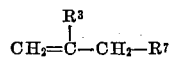

where $R^3$ is as defined above and $R^7$ is hydrogen, hydrocarbyl free of aliphatic unsaturation of 1 through 15 carbon atoms, or the group

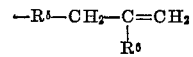

where $R^5$ and $R^6$ are as defined above, and wherein the olefin contains 3 through 18 carbon atoms.

This reaction is represented in part by the equation:

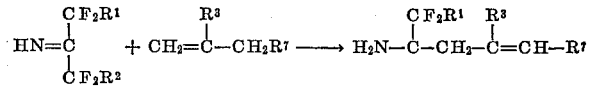

whereby the fluoroalkylideneimine adds to the terminally unsaturated olefin with formation of a double bond one carbon removed from the original terminal carbon.

The reaction may take several courses depending upon the amount of the fluoroalkylideneimine employed and the nature of the initial reaction product.

When he reactant is a monoolefin, an α,α-di(fluoroalkyl)monoamine forms initially. This will be the sole reaction product (aside from by-products occasionally resulting from side reactions) when the double bond present in this monoamine adduct is internal. In this case, the radicals $R^3$ and $R^4$ (see above) are either hydrogen or aliphatically saturated hydrocarbon. However, when the double bond formed in the initial reaction, and therefore present in the monoamine adduct, is itself a terminal one and a carbon gamma to the terminal carbon but not adjacent to the bis(α,α-di-(fluoroalkyl)amine) group, bears hydrogen, this double bond also can react with the fluoroalkylideneimine, especially if the latter was originally present in molar excess relative to the olefin. In this case, the reaction product may contain in substantial or predominant amount the 2:1 molar adduct of the fluoroalkylideneimine and the olefin, i.e., a bis[α,α-di(fluoroalkyl)amine], $R^3$ being then the radical

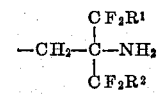

When the reactant is a diolefin, both terminal double bonds may react, and normally do when the fluoroalkylideneimine is used in sufficient amount. In this case, the reaction product is a bis[α,α-di(fluoroalkyl)amine], $R^4$ being then the radical

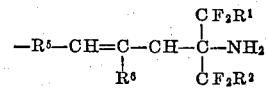

If desired, however, it is possible to adjust the operating conditions, in particular the reactant molar ratio, so that at least part of the diolefin reacts through only one terminal double bond, the reaction product then containing the 1:1 adduct, i.e., a monoamine in which $R^4$ is the radical

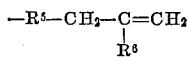

The terminally unsaturated olefin, the imine and the catalyst are reacted under essentially anhydrous conditions at a temperature in the range of 20–200° C., preferably 50–150° C. No reaction medium is necessary but, if desired, inert solvents such as the aliphatic and cycloaliphatic saturated hydrocarbons, e.g., hexane, octane, cyclohexane, or other solvents such as tetrachloroethane or carbon disulfide may be employed as reaction media. The two reactants may be used in any desired molar ratio, but preferably there is used approximately one mole (e.g., between 0.8 and 1.2 mole) of fluoroimine for each double bond it is desired to bring into reaction. Thus, with a monoolefinic reactant, approximately one mole of fluoroimine per mole will be used unless the double bond formed in the initial monoamine reaction product is itself a terminal (i.e., reactive) one and it is desired to add another mole of the fluoroimine to this double bond. In this case (which is illustrated in Example IV) more flouroimine, e.g., two or more moles per mole of olefin, may be used. The initial, terminally unsaturated monoamine may also, if desired, be isolated and reacted separately with another mole of fluoroimine. When the olefin reactant is a diolefin, i.e., contains two terminal double bonds, the fluoroimine reactant can be used in the ratio of approximately two moles to one.

The catalyst may be present in a molar ratio, based on the amount of fluoroimine used, between 0.01:1 and 0.25:1, depending on the sensitivity of the reactants and products to acid catalyzed decomposition and on the ability of the product to complex with the catalyst. Catalysts which may be used include aluminum chloride, aluminum bromide, boron trifluoride, boron trichloride, antimony pentachloride, zinc chloride, ferric chloride, hydrogen fluoride, stannous chloride, and the like.

Pressure is not critical, however, autogeneous pressure is normally used with volatile reactants requiring the use of a closed reactor. With less volatile reactants, the reaction is conveniently conducted at atmospheric pressure. Substantial conversions are normally obtained in a reaction time of 4–16 hours at the operating temperature. The products are liquids which may be isolated by distillation at atmospheric or reduced pressure and, if necessary, further purified by gas chromatography.

The following examples illustrate the invention in greater detail. The reactor lining referred to in these examples as "Hastelloy" is a nickel-iron-molybdenum alloy.

EXAMPLE I

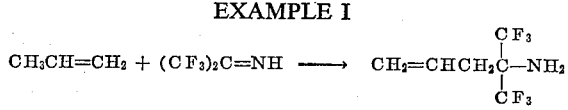

A 5-g. sample (0.12 mole) of propylene was reacted in a "Hastelloy"-lined autoclave with 4.6 g. of aluminum chloride and 16 g. (0.099 mole) of hexafluoroisopropylideneimine for 4 hours at room temperature, 4 hours at 50° C. and 8 hours at 100° C. Distillation of the reaction mixture in a spinning band still gave 7.0 g. (35% yield) of the 1:1 adduct, B.P. 97–98° C. This product can be called 1-(2-aminohexafluoroisopropyl)-2-propene or 2 - amino-2-trifluoromethyl-1,1,1 - trifluoro-4-pentene. The $F^{19}$ NMR showed a singlet at +4268 cps. (internal $FCCl_3$) and the $H^1$ NMR showed an $AB_2$ multiplet at $\tau$4.6, a doublet (separation 7 cps.; —$CH_2$—) at $\tau$7.27 and a singlet ($NH_2$) at $\tau$7.95. The mass spectrum showed a molecular weight of 207 and the expected fragmentation; the infrared spectrum showed >NH, >C=C<, and —$CF_3$ absorption.

Analysis.—Calcd. for $C_6H_7NF_6$: C, 34.79; H, 3.41; N, 6.77; F, 55.04. Found: C, 34.84; H, 3.11; N, 6.51; F, 55.41.

EXAMPLE II

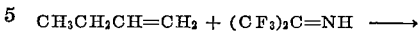
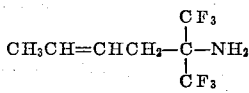

An 11-g. sample (0.21 mole) of 1-butene was heated as per Example I at 75° C. for 16 hours with 2.06 g. of aluminum chloride and 33 g. (0.20 mole) of hexafluoroisopropylideneimine. Distillation in a spinning band still gave 8.3 g. (19% yield), B.P. 114–118° C. of 1-(2-aminohexafluoroisopropyl)-2-butene, which may also be called 2-amino-2-trifluoromethyl-1,1,1-trifluoro - 4 - hexene. $H^1$ NMR showed a multiplet (area 2) at $\tau$4.3, a singlet at $\tau$6.5 (area 2) and doublet at $\tau$7.38 (separation 6.5 cps.; area 2) and doublet (separation 5 cps.; area 3) at $\tau$8.26. The $F^{19}$ NMR was a singlet at +4270 cps. (internal $FCCl_3$). Higher boiling products were formed also.

Analysis.—Calcd. for $C_7H_9NF_6$: N, 6.34; F, 51.55. Found: N, 5.82; F, 51.59.

EXAMPLE III

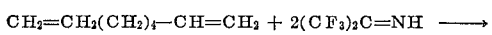
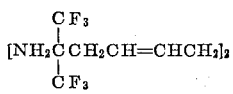

An 11-g. sample (0.10 mole) of 1,7-octadiene, 3 g. of aluminum chloride and 35 g. of hexafluoroisopropylideneimine (0.20 mole) were heated together in a "Hastelloy"-lined autoclave for 16 hours at 75° C. The reaction mixture was combined with 5 g. of solid sodium bicarbonate and distilled through a spinning band column. The product boiling from 98° C. (3 mm.) to 107° C. (1.5 mm.) [heart cuts at 88° C./0.75 mm.], 15.4 g., was shown by gas chromatographic analysis to contain over 80% of the 2:1 adduct (29% corrected yield). This diamine may be called 1,8-bis(2-aminohexafluoroisopropyl)-2,6-octadiene, or 2,11-diamino-2,11-bis(trifluoromethyl)-1,1,1,12,12,12-hexafluoro - 4,8 - dodecadiene. A sample was purified by preparative gas chromatography. $F^{19}$ NMR showed a singlet at +4310 cps. from internal $FCCl_3$ (56.4 mc.). $H^1$ NMR showed vinyl-H (area 4) at $\tau$4.39, isolated —$CH_2$ (area 4) at $\tau$7.43, doublet for —$CH_2CH_2$— (J=7 cps.) at $\tau$7.80 and $NH_2$ at $\tau$8.25. The mass spectrum showed a parent peak at m/e 440 and the expected fragmentation.

Analysis.—Calcd. for $C_{14}H_{16}N_2F_{12}$: C, 38.18; H, 3.67; N, 6.37; F, 51.79. Found: C, 38.76; H, 3.76; N, 6.09; F, 51.97.

EXAMPLE IV

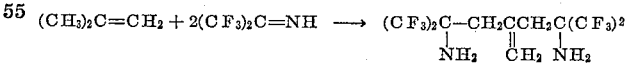

A mixture of 5 g. of isobutylene (0.09 mole), 34 g. of hexafluoroisopropylideneimine (0.2 mole) and 2.5 g. of aluminum chloride was sealed in a glass Carius tube at liquid nitrogen temperature, and the tube was heated for 23 hours in a steam bath. The tube was then cooled and vented at room temperature, the non-volatile material mixed with 10% hydrochloric acid and the resulting heavy oil extracted with methylene chloride. The extracts were dried over magnesium sulfate and distilled. The product diamine, 7.2 g., B.P. 53° C. (1.2 mm.) $n_D^{25}$ 1.3597, was collected. This product may be called 1-(2-aminohexafluoroisopropyl) - 2 - [(2 - aminohexafluoroisopropyl)methyl]-2-propene or, alternatively, 2-amino-2-trifluoromethyl-4-[(2-amino - 2 - trifluoromethyl-1,1,1-trifluoro)propyl]-1,1,1-trifluoro-4-pentene. The $H^1$ NMR showed singlets at $\tau$4.75 (=$CH_2$), $\tau$7.30 (2$CH_2$), and $\tau$8.15 (2$NH_2$). The $F^{19}$NMR showed a singlet at +4344 cps. from $FCCl_3$ at 56.4 mc.

*Analysis.*—Calcd. for $C_{10}H_{10}F_{12}N_2$: C, 31.11; H, 2.62; F, 59.07; N, 7.26. Found: C, 31.55; H, 2.52; F, 59.01; N, 7.03.

EXAMPLE V

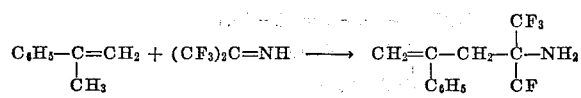

A mixture of 35 g. of α-methylstyrene (0.28 mole), 12 g. of zinc chloride and 46 g. of hexafluoroisopropylideneimine (0.28 mole) was heated at 125° C. for 16 hours. The recovered material (77 g.) was filtered by suction and washed with ether. The filtrate and ether wash were combined and distilled, affording 13.3 g. of 75% pure (gas chromatographic analysis) 1:1 adduct, B.P. 68° C. (3–2 mm.), 12% corrected yield. This product may be called 1-(2-aminohexafluoroisopropyl)-2-phenyl-2-propene or 2-amino-2-trifluoromethyl-1,1,1-trifluoro-4-phenyl-4-pentene. A sample purified by preparative gas chromatography showed $n_D^{25}$ 1.4535. $H^1$ NMR showed aromatic —H at τ2.72, an AB pattern at τ4.65, τ4.75 for =$CH_2$, a singlet at τ6.92 for —$CH_2$— and $NH_2$ absorption at τ8.6. The $F^{19}$ NMR exhibited a singlet at +422 cps. for external $FCCl_3$ at 56.4 mc.

*Analysis.*—Calcd. for $C_{12}H_{11}NF_6$: C, 50.89; H, 3.84; N, 4.95; F, 40.28. Found: C, 51.03; H, 3.96; N, 4.41; F, 40.39.

Table I gives additional specific examples of products of the invention that can be obtained by the above described process.

TABLE I

| Imine (catalyst) | Olefin | Product |
|---|---|---|
| $CF_2Cl$\\$C=NH$/$CF_3(CF_2)_4$  (AlCl$_3$) | $CH_2CH_2C_6H_5$  $C_6H_{13}$ $CH_2=C$————$CH_2$ | $CF_2Cl$  $CH_2CH_2C_6H_5$  $C_6H_{13}$ $NH_2C$—$CH_2$—$C=CH$ $(CF_2)_4CF_3$ |
| $HCF_2(CF_2)_4$\\$C=NH$/$CF_3$  (AlCl$_3$) | $C_{10}H_7$ $CH_2=C$—$CH_3$ | $(CF_2)_4CF_2H$  $C_{10}H_7$ $NH_2$—$C$—$CH_2$—$C\!\!\diagdown\!\!CH_2$ $CF_3$ |
| $CF_2Cl$\\$C=NH$/$CF_3$  (AlCl$_3$) | $CH_2CH_3$ $CH_2=C$—$CH_3$ | $CF_2Cl$  $CH_2CH_3$   $CF_2Cl$  $CHCH_3$ $NH_2C$—$CH_2C=CH_2$ + $NH_2C$—$CH_2CCH_3$ $CF_3$   $CF_2$ |
| $CF_2Cl$\\$C=NH$/$CF_2Cl$  (AlCl$_3$) | $C(CF_2Cl)_2NH_2$  $CH_2$ $CH_2=C$—$CH_2$—$CH_3$ | $CF_2Cl$  $CHCH_3$  $CF_2Cl$ $NH_2$—$C$—$CH_2$—$C$—$CH_2$—$C$—$NH_2$ $CF_2Cl$   $CF_2Cl$ |
| $C_2F_5$\\$C=NH$/$C_2F_5$  (AlCl$_3$) | $CH_3$  $CH_3$ $CH_2=C(CH_2)_8C=CH_2$ | $C_2F_5$  $CH_3$   $CH_3$ $NH_2$—$C$—$CH_2$—$C=CH(CH_2)_7C=CH_2$ $C_2F_5$ |
| $CF_3$\\$C=NH$/$CF_3$  (SbCl$_5$) | $CH_2=CH(CH_2)_3CH=CH_2$ | $CF_3$   $CF_3$ $NH_2$—$C$—$CH_2CH=CHCH_2CH=CHCH_2$—$C$—$NH_2$ $CF_3$   $CF_3$ |
| $CF_3(CF_2)_6$\\$C=NH$/$CF_3(CF_2)_6$  (BF$_3$) | $CH_2$ $\|\|$ $CH_3C_6H_4C$—$CH_3$ | $(CF_2)_6CH_3$  $CH_2$  $\|\|$ $NH_2$—$C$—$CH_2$—$C$—$C_6H_4CH_3$ $(CF_2)_6CH_3$ |
| $C_3F_7$\\$C=NH$/$C_3F_7$  (HF) | $CH_2=CH(CH_2)_{15}CH_3$ | $C_3F_7$ $NH_2$—$C$—$CH_2CH=CH(CH_2)_{14}CH_3$ $C_3F_7$ |
| $HCF_2CF_2$\\$C=NH$/$HCF_2(CF_2)_3$  (SnCl$_4$) | $CH_2(CH_2)_2CH_3$ $CH_2=C$ $CH_2(CH_2)_2CH_3$ | $CF_2CF_2H$  $CH_2(CH_2)_3CH_3$ $NH_2$—$C$—$CH_2$——$C=CH(CH_2)_3CH_2$ $(CF_2)_3CF_2H$ |

TABLE I—Continued

| Imine (catalyst) | Olefin | Product |
|---|---|---|
| ClCF$_2$(CF$_2$)$_6$<br>\\<br>C=NH<br>/<br>ClCF$_2$(CF$_2$)$_6$<br>(FeCl$_3$) | CH$_2$=C—CH$_2$—CH$_3$<br>\|<br>CH<br>/ \\<br>H$_2$C   CH$_2$<br>\|       \|<br>H$_2$C   CH$_2$<br>\\ /<br>CH$_2$ | (CF$_2$)$_6$CF$_2$Cl<br>\|<br>H$_2$N—C—CH$_2$—C=CH—CH$_3$<br>\|                       \|<br>                          C$_6$H$_{11}$<br>(CF$_2$)$_6$CF$_2$Cl |

The fluoroimines used herein as reactants are obtained by reacting a polyfluoroketone with at least one molar equivalent of ammonia at −50° to 10° C., followed by dehydration of the resulting aminohydroxy polyfluoroalkane with a dehydrating agent in the presence of an acid acceptor, and then distilling to recover the imine. The imine reactant may also be prepared by reacting hydrazoic acid with a polyfluorothioketone. Both of these preparatory methods for the polyfluoroalkylideneimine are disclosed and claimed in the co-assigned patent, application U.S. Ser. No. 250,501, filed Jan. 10, 1963, and allowed May 18, 1965, and now U.S. Patent No. 3,226,439. The preparation of several of these fluoroimines

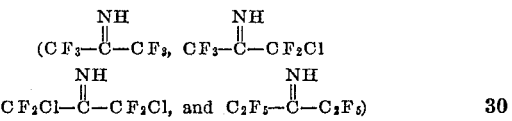

$$(CF_3-\overset{NH}{\overset{\|}{C}}-CF_3,\ CF_3-\overset{NH}{\overset{\|}{C}}-CF_2Cl$$
$$CF_2Cl-\overset{NH}{\overset{\|}{C}}-CF_2Cl,\ \text{and}\ C_2F_5-\overset{NH}{\overset{\|}{C}}-C_2F_5)$$

is also described in a paper by Middleton and Krespan in J. Org. Chem. 30, 1398 (1965).

The products of this invention are useful as metal degreasing agents. For this purpose, they can be used in the vapor phase either at atmospheric pressure or under reduced pressure, or in the liquid phase at elevated temperature. The following example illustrates this utility.

EXAMPLE VI

Strips were cut from a steel coupon containing an oily film to protect it from rusting. One strip was held for about one minute in the vapors of the diamine obtained from hexafluoroisopropylideneimine and 1,7-octadiene. Another strip was likewise treated with the monoamine obtained from hexafluoroisopropylideneimine and propylene. These strips, together with an untreated strip, were placed in a beaker containing a few drops of water. The amine-treated strips rusted rapidly (in about 30 minutes) while the untreated strip did not. Thus, these compounds are effective degreasing agents.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Compounds having the formula

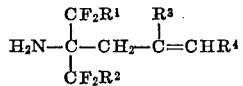

wherein
(1) R$^1$ and R$^2$ each are fluorine, chlorine, perfluoroalkyl, ω-chloroperfluoroalkyl or ω-hydroperfluoroalkyl in which each said alkyl group contains 1 through 6 carbon atoms;
(2) R$^3$ is hydrogen, hydrocarbyl free of aliphatic unsaturation of 1 through 15 carbon atoms or the group

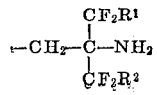

(3) R$^4$ is hydrogen, hydrocarbyl free of aliphatic unsaturation of 1 through 15 carbon atoms, the group

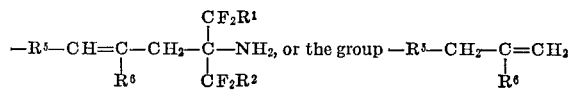

(4) R$^5$ is a divalent alkylene group of 1 through 6 carbon atoms;
(5) R$^6$ is hydrogen or hydrocarbyl free of aliphatic unsaturation of 1 through 15 carbon atoms; and wherein
(6) the number of —NH$_2$ groups in the composition is not more than 2;
(7) the number of carbon atoms, exclusive of

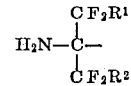

groups, is 3 through 18; and
(8) the total number of carbon atoms in the compound is not more than 30.

2. The compounds of claim 1 wherein R$^1$ and R$^2$ are fluorine and R$^3$ and R$^4$ are hydrocarbyl groups free of aliphatic unsaturation containing 1 through 15 carbon atoms.

3. The compounds of claim 1 wherein R$^1$ and R$^2$ are fluorine and R$^3$ and R$^4$ are alkyl groups of 1 through 15 carbon atoms.

4. The compounds of claim 1 wherein R$^1$ and R$^2$ are fluorine, R$^3$ is hydrogen and R$^4$ is alkyl of 1 through 15 carbon atoms.

5. The compound of claim 1 wherein R$^1$ and R$^2$ are fluorine and R$^3$ and R$^4$ are hydrogen.

6. The compounds of claim 1 wherein R$^1$ and R$^2$ are fluorine, R$^3$ is hydrogen and R$^4$ is methyl.

7. The compound of claim 1 wherein R$^1$ and R$^2$ are fluorine, R$^3$ is hydrogen and R$^4$ is

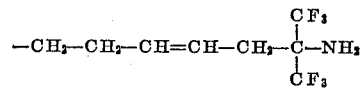

8. The compound of claim 1 wherein R$^1$ and R$^2$ are fluorine, R$^3$ is

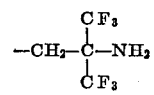

and R$^4$ is hydrogen.

9. The compound of claim 1 wherein R$^1$ and R$^2$ are fluorine, R$^3$ is phenyl and R$^4$ is hydrogen.

10. Process for preparing the α,α-di(fluoroalkyl) amines of claim 1 which comprises reacting, in the presence of a Friedel-Crafts catalyst, at a temperature between 20 and 200° C. and under substantially anhydrous conditions, a compound of the formula

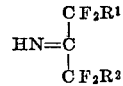

wherein R$^1$ and R$^2$ are each fluorine, chlorine, perfluoroalkyl, ω-chloroperfluoroalkyl, or ω-hydroperfluoroalkyl, in which each said alkyl group contains 1 through 6 carbon atoms, with a compound of the formula $$CH_2=\underset{\underset{R^3}{|}}{C}-CH_2-R^7$$

of 3 through 18 total carbon atoms wherein $R^3$ is hydrogen, hydrocarbyl free of aliphatic unsaturation of 1 through 15 carbon atoms, or $$-CH_2-\underset{\underset{CF_2R^2}{|}}{\overset{\overset{CF_2R^1}{|}}{C}}-NH_2$$

and $R^7$ is hydrogen, hydrocarbyl free of aliphatic unsaturation of 1 through 15 carbon atoms, or $$-R^5-CH_2-\underset{\underset{R^6}{|}}{C}=CH_2$$

wherein $R^5$ is divalent alkylene of 1 through 6 carbon atoms and $R^6$ is hydrogen or hydrocarbyl free of aliphatic unsaturation of 1 through 15 carbon atoms.

References Cited

Zeifman et al., "Bull. Acad. Sci. USSR," vol. 8, pp. 1431–33 (1965).

ROBERT V. HINES, Primary Examiner

U.S. Cl. X.R.

252—357; 260—563, 566, 583, 584

PO-1050
(5/69)

UNITED STATES PATENT OFFICE
CERTIFICATE OF CORRECTION

Patent No. 3,478,100      Dated November 11, 1969

Inventor(s) David M. Gale

It is certified that error appears in the above-identified patent and that said Letters Patent are hereby corrected as shown below:

Column 2, line 29, the left-hand portion of the last formula reading
$$\begin{array}{c} CF_2R^1 \\ | \\ H_2N-C-CH_2- \end{array}$$
should read
$$\begin{array}{c} CF_2R^1 \\ | \\ H_2N-C-CH_2- \\ | \\ CF_2R^2 \end{array}$$

Column 5, line 5, the right-hand portion of the last formula reading
$$\begin{array}{c} CF_3 \\ | \\ -C-NH_2 \\ | \\ CF \end{array}$$
should read
$$\begin{array}{c} CF_3 \\ | \\ -C-NH_2 \\ | \\ CF_3 \end{array}$$

Column 6, line 9, "+422" should be -- +4272 --.

SIGNED AND
SEALED
DEC 1 - 1970

(SEAL)
Attest:

Edward M. Fletcher, Jr.
Attesting Officer

WILLIAM E. SCHUYLER, JR.
Commissioner of Patents